US008836639B2

(12) United States Patent
Kaneshige et al.

(10) Patent No.: US 8,836,639 B2
(45) Date of Patent: *Sep. 16, 2014

(54) STORAGE MEDIUM STORING GAME PROGRAM AND GAME APPARATUS

(75) Inventors: Tsutomu Kaneshige, Kyoto (JP); Yoshitaka Ajioka, Kyoto (JP); Kiyoshi Mizuki, Kyoto (JP); Yasushi Ebisawa, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 194 days.

This patent is subject to a terminal disclaimer.

(21) Appl. No.: 13/149,211

(22) Filed: May 31, 2011

(65) Prior Publication Data
US 2011/0227916 A1 Sep. 22, 2011

Related U.S. Application Data

(63) Continuation of application No. 11/288,376, filed on Nov. 29, 2005, now Pat. No. 8,120,574.

(30) Foreign Application Priority Data

Mar. 10, 2005 (JP) ................................. 2005-067812

(51) Int. Cl.
G09G 5/00 (2006.01)
A63F 13/40 (2014.01)

(52) U.S. Cl.
CPC .......... *A63F 13/10* (2013.01); *A63F 2300/6045* (2013.01); *A63F 2300/1075* (2013.01); *A63F 2300/6661* (2013.01); *A63F 2300/301* (2013.01)
USPC ......................................... 345/156; 345/157

(58) Field of Classification Search
USPC ....................... 345/156–167, 419; 463/30–33
See application file for complete search history.

(56) References Cited

U.S. PATENT DOCUMENTS 5,471,569 A 11/1995 Katoh
5,745,126 A 4/1998 Jain et al.
6,124,862 A 9/2000 Boyken et al.
(Continued)

FOREIGN PATENT DOCUMENTS

JP 5-94500 4/1993
JP 05-094500 4/1993
(Continued)

OTHER PUBLICATIONS

Explanation of Circumstances Concerning Accelerated Examination submitted Jul. 31, 2008 in corresponding Japanese Application No. 2005-67812.

*Primary Examiner* — Alexander Eisen
*Assistant Examiner* — Nelson Lam
(74) *Attorney, Agent, or Firm* — Nixon & Vanderhye P.C.

(57) ABSTRACT

A computer generating a three-dimensional space and the images to be shown on a display: sets a first angle of view of the virtual camera; displays the image in accordance with the first angle of view; detects a position on the displayed image pointed to by the input device; calculates a straight line passing through the detected position and the virtual camera in the three-dimensional space; identifies an object intersecting the straight line; automatically sets a second angle of view of the virtual camera to zoom in and display the identified object, and displays the identified object using the display device from the perspective of the second angle of view.

16 Claims, 11 Drawing Sheets

(56) References Cited

U.S. PATENT DOCUMENTS

| | | | |
|---|---|---|---|
| 6,188,432 B1* | 2/2001 | Ejima | 348/240.99 |
| 6,217,446 B1* | 4/2001 | Sanbongi et al. | 463/7 |
| 6,462,733 B1 | 10/2002 | Murakami | |
| 6,556,204 B1 | 4/2003 | Itai et al. | |
| 6,597,380 B1 | 7/2003 | Wang et al. | |
| 6,650,329 B1* | 11/2003 | Koike | 345/473 |
| 6,897,854 B2 | 5/2005 | Cho et al. | |
| 6,972,756 B1 | 12/2005 | Yamamoto | |
| 7,274,356 B2 | 9/2007 | Ung et al. | |
| 7,307,655 B1* | 12/2007 | Okamoto et al. | 348/222.1 |
| 7,411,575 B2 | 8/2008 | Hill et al. | |
| 7,445,549 B1 | 11/2008 | Best | |
| 8,120,574 B2* | 2/2012 | Kaneshige et al. | 345/156 |
| 8,139,027 B2* | 3/2012 | Kaneshige et al. | 345/156 |
| 2002/0122117 A1 | 9/2002 | Nakagawa et al. | |
| 2002/0175911 A1 | 11/2002 | Light et al. | |
| 2003/0043270 A1 | 3/2003 | Rafey et al. | |
| 2003/0076413 A1* | 4/2003 | Kanade et al. | 348/139 |
| 2003/0122774 A1 | 7/2003 | Harada | |
| 2003/0139209 A1 | 7/2003 | Nakayama | |
| 2003/0184517 A1 | 10/2003 | Senzui et al. | |
| 2003/0210329 A1* | 11/2003 | Aagaard et al. | 348/159 |
| 2004/0224761 A1* | 11/2004 | Nishimura | 463/33 |
| 2004/0224762 A1 | 11/2004 | Haga et al. | |
| 2005/0018045 A1 | 1/2005 | Thomas et al. | |
| 2005/0018144 A1 | 1/2005 | Wada et al. | |
| 2005/0075167 A1 | 4/2005 | Beaulieu et al. | |
| 2005/0089212 A1 | 4/2005 | Mashitani et al. | |
| 2005/0091019 A1* | 4/2005 | Clavadetscher | 703/8 |
| 2005/0187015 A1 | 8/2005 | Suzuki et al. | |
| 2005/0195478 A1 | 9/2005 | Yanagawa et al. | |
| 2006/0040738 A1* | 2/2006 | Okazaki et al. | 463/32 |

FOREIGN PATENT DOCUMENTS

| | | |
|---|---|---|
| JP | 9-167048 | 6/1997 |
| JP | 9-311764 | 12/1997 |
| JP | 2000-067262 | 3/2000 |
| JP | 2001-84103 | 3/2001 |
| JP | 2001-178963 | 7/2001 |
| JP | 2002-018127 | 1/2002 |
| JP | 2002-163676 | 6/2002 |
| JP | 2002-230132 | 8/2002 |
| JP | 2002-366973 | 12/2002 |
| JP | 2003-296014 | 10/2003 |

* cited by examiner

STORAGE MEDIUM STORING GAME PROGRAM AND GAME APPARATUS

CROSS-RELATED APPLICATION

This application is a continuation of application Ser. No. 11/288,376 filed Nov. 29, 2005, now U.S. Pat. No. 8,120,574 and claims priority to Japanese Patent Application Nos. 2005-067812 filed on Mar. 10, 2005 which applications are incorporated in their entirety by reference herein.

BACKGROUND OF THE INVENTION

1. Field of the Invention

The present invention relates to a storage medium storing a game program and a game apparatus, and more particularly, to a game apparatus and a storage medium storing a game program in which display of an object appearing in a three-dimensional game space is changed based on an operation of an input device capable of pointing the object on a predetermined screen.

2. Description of the Background Art

Conventionally, various games have been developed in which an object displayed on a game screen can be zoomed in. In such games, for example, an object is selected from a plurality of objects displayed on the game screen by a player and is then zoomed in. Specifically, the watching point of a camera is set on the object, viewpoints of the camera are switched, and the selected object is zoomed in (see, for example, Japanese Patent Laid-Open Publication No. 2001-178963).

According to the above-described conventional technique, however, a player uses a cross key or a button so as to select an object which the player wants to zoom in and display. Therefore, it is not possible to perform an intuitive operation which directly points an object.

BRIEF DESCRIPTION OF THE INVENTION

Therefore, in one embodiment the present invention provides a storage medium storing a game program and a game apparatus in which an object is pointed in an intuitive manner, and the pointed object is zoomed in.

A first aspect of an embodiment of the present invention is directed to a storage medium storing a game program executable on a computer of a game apparatus having a display device (a second LCD 12 in correspondence with an example described below) and an input device (15). The game program comprises a first camera setting step (e.g., step S11 in correspondence with the example; hereinafter referred to using only a step number), a first display step (S12), a position detecting step (S23), a straight line calculating step (S24), an object identifying step (S25), a second camera setting step (S14), and a second display step (S12). The display device displays a game image obtained by viewing a virtual three-dimensional game space from a virtual camera, in which an object appears. The input device is used so as to point a position on a screen of the display device. The first camera setting step sets a value of a parameter of the virtual camera. The first display step causes the display device to display the game image in accordance with the parameter set by the first camera setting step. The position detecting step detects a position on the screen pointed by an operation performed with respect to the input device when the game image is displayed by the first display step. The straight line calculating step of calculating a straight line passing through a position corresponding to the position in the three-dimensional game space detected by the position detecting step and a position of the virtual camera. The object identifying step identifies an object intersecting the straight line. The second camera setting step changes the value of the parameter of the virtual camera so as to zoom in and display the identified object. The second display step causes the display device to display the game image in accordance with the parameter changed by the second camera setting step.

In a second aspect of an embodiment of the present invention based on the first aspect, the game program causes the computer to further execute an area setting step (S11) of setting a predetermined area for each object. In the object identifying step, when the area intersects the straight line, the object is identified.

In a third aspect of an embodiment of the present invention based on the second aspect, the area set by the area setting step is a sphere.

In a fourth aspect of an embodiment of the present invention based on the second aspect, in the second camera setting step, a watching point of the virtual camera is caused to coincide with a predetermined point of the identified object, and an angle of view of the virtual camera is set based on the area set for the identified object, thereby changing the value of the parameter of the virtual camera.

In a fifth aspect of an embodiment of the present invention based on the first aspect, the game program causes the computer to further execute a first condition determining step (S31) of determining whether or not a pointing duration exceeds a first predetermined value, the pointing duration being a time for which the pointing operation is continued, when an object is identified by the object identifying step. The second camera setting step changes the value of the parameter when it is determined in the first condition determining step that the pointing duration exceeds the first predetermined value.

In a sixth aspect of an embodiment of the present invention based on the first aspect, the game program has a second condition determining step (S41) and a third camera setting step (S42). The second condition determining step determines whether or not a pointing duration exceeds a second predetermined value, the pointing duration being a time for which the pointing operation is continued, when an object is identified by the object identifying step. The third camera setting step sets the value of the parameter of the virtual camera back to the value set by the first camera setting step, when it is determined in the second condition determining step that the pointing duration exceeds the second predetermined value.

In a seventh aspect of an embodiment of the present invention based on the sixth aspect, the game program has an operation type determining step (S27), a parameter changing step (S28), and a second predetermined value setting step (S29). The operation type determining step determines a type of an operation performed by a player based on contents of the operation when the game image is displayed by the second display step. The parameter changing step changes the value of the parameter of the object based on the determined type. The second predetermined value setting step sets the second predetermined value based on the value of the parameter changed by the parameter changing step.

An eighth aspect of an embodiment of the present invention is directed to a game apparatus having a display device (12), an input device (15), first camera setting means (S11), first display means (S12), position detecting means (S23), straight line calculating means (S24), object identifying means (S25), second camera setting means (S14), and second display means (S12). The first camera setting means sets a value of a parameter of the virtual camera. The first display means causes the display device to display the game image in accordance with the parameter set by the first camera setting step. The position detecting means detects a position on the screen pointed by an operation performed with respect to the input device when the game image is displayed by the first display step. The straight line calculating means calculates a straight line passing through a position corresponding to the position in the three-dimensional game space detected by the position detecting step and a position of the virtual camera. The object identifying means identifies an object intersecting the straight line. The second camera setting means changes the value of the parameter of the virtual camera so as to zoom in and display the identified object. The second display means causes the display device to display the game image in accordance with the parameter changed by the second camera setting step.

According to the first aspect, when a player performs an operation for pointing an object, the object is zoomed in and displayed. Therefore, the player can more easily recognize a target operated object, and in addition, the player can more easily operate the object.

According to the second and third aspects, objects are identified using predetermined areas set for respective objects, thereby making it possible to reduce the load of a process of identifying the objects.

According to the fourth aspect, an area is set for each object, and an angle of view of a camera is controlled based on the area for an object when the object is zoomed in. Therefore, an object can be more easily zoomed in than when the size of the object and the angle of view of the camera are calculated every time a zoom-in process is performed. In addition, the angle of view of the camera can be easily set so that each object is zoomed in.

According to the fifth aspect, a camera control is performed so that, after the duration of a pointing operation becomes larger than or equal to a predetermined time, an object is zoomed in. Therefore, it is possible to prevent the camera control from being performed based on an object erroneously selected by an erroneous operation which is not intended by a player. In addition, the camera control is performed only after an object pointing operation of a player continues for a predetermined time or more. Therefore, viewpoints are not frequently switched, whereby game performance can be improved.

According to the sixth aspect, after a camera is controlled to zoom in object, and then the duration of an operation by a player becomes larger than or equal to a predetermined time, the camera control can be brought back to an original state.

According to the seventh aspect, a time until a camera control which zooms in an object is brought back to an original state is set based on a parameter of the object, thereby making it possible to set a time until a camera control is brought back to an original state for each object. In addition, since the parameter value is changed depending on the type of an operation performed by a player, the time until the camera control is brought back to the original state can be changed depending on the contents of the operation.

According to the eighth aspect, an effect similar to that of the first aspect can be obtained.

These and other aspects of the present invention will become more apparent from the following detailed description of the present invention when taken in conjunction with the accompanying drawings. The aspects listed above are exemplary. One or more of the listed aspects may be incorporated into embodiments of the invention.

DETAILED DESCRIPTION OF THE INVENTION

Hereinafter, embodiments of the present invention will be described with reference to the accompanying drawings. Note that the present invention is not limited to these embodiments.

Figure 1:
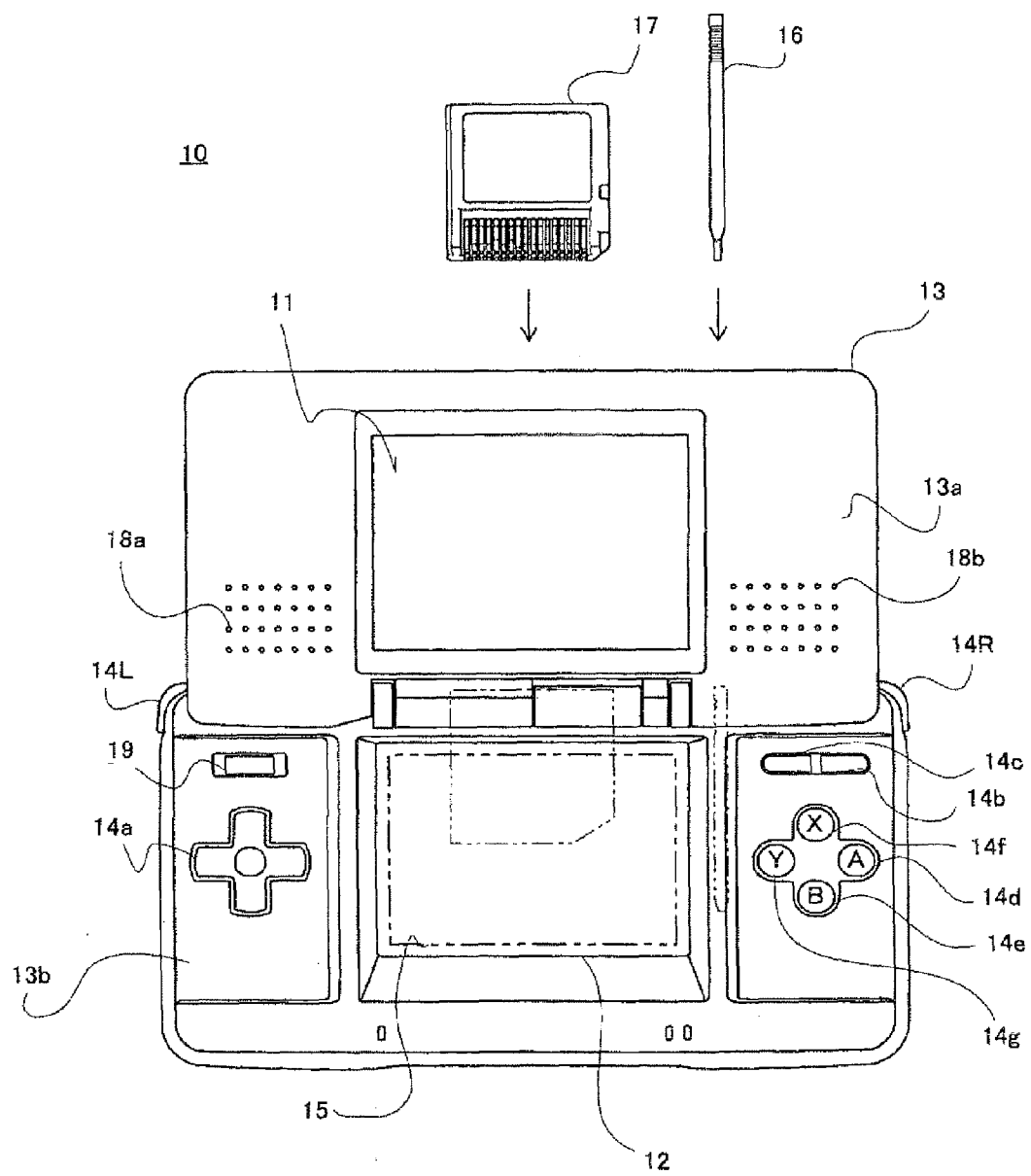
FIG. 1 is a diagram illustrating an external appearance of a game apparatus according to an embodiment of the present invention.

FIG. 1 is a diagram illustrating an external appearance of a game apparatus according to an embodiment of the present invention. In FIG. 1, the game apparatus is composed of a first LCD (Liquid Crystal Display device) 11 and a second LCD 12. A housing 13 is composed of an upper housing 13a and a lower housing 13b. The first LCD 11 is housed in the upper housing 13a, while the second LCD 12 is housed in the lower housing 13b. The first LCD 11 and the second LCD 12 each have a resolution of 256 dots.times.192 dots. Although an LCD is used as a display device in the embodiment, any other display devices, such as a display device employing EL (Electro Luminescence) and the like, can be used. Also, the display device can have any resolution.

Sound holes 18a and 18b through which sound is emitted from a pair of loudspeakers (30a and 30b in FIG. 2) described below to the outside are formed on the upper housing 13a.

On the lower housing 13b, a cross switch 14a, a start switch 14b, a select switch 14c, an A-button 14d, a B-button 14e, an X-button 14f, a Y-button 14g, an L-button 14L, and an R-button 14R are provided as input devices. As an additional input device, a touch panel 15 is attached onto a screen of the second LCD 12. In addition, the lower housing 13b is provided with a power switch 19, and slots into which a memory card 17 and a stick 16 are inserted.

The touch panel 15 may be of any type including, for example, a resistance film type, an optical (infrared) type, and an electrostatic capacitance coupling type, and the like. The touch panel 15 has a function of outputting coordinate data corresponding to a touch position when the stick 16 touches a surface of the touch panel 15. Although it is hereinafter assumed that a player operates the touch panel 15 using the stick 16, a pen (stylus pen) or a finger can be used instead of the stick 16 so as to operate the touch panel 15. In the embodiment, the touch panel 15 has the resolution (detection precision) as that of the second LCD 12, i.e., 256 dots.times.192 dots. Note that the touch panel 15 and the second LCD 12 do not have to have the same resolution.

The memory card 17 is a recording medium which stores a game program, and is detachably inserted into the slot provided in the lower housing 13b.

Next, an internal structure of the game apparatus 10 will be described with reference to FIG. 2.

Figure 2:
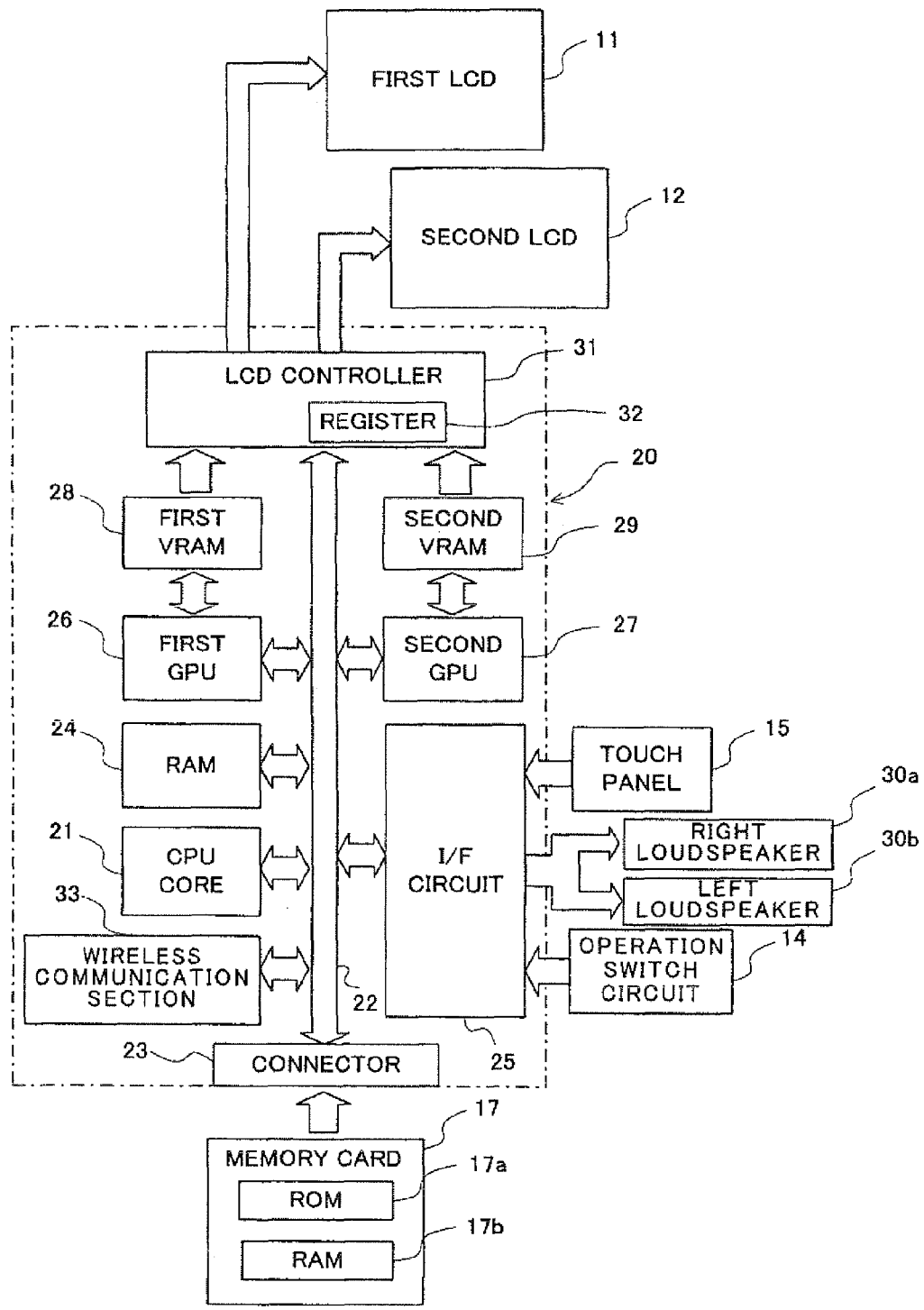
FIG. 2 is a diagram illustrating an internal structure of a game apparatus 10 of FIG. 1.

In FIG. 2, a CPU core 21 is provided on an electronic circuit board 20 which is housed in the housing 13. A connector 23, an input/output interface circuit (denoted as I/F circuit in FIG. 2) 25, a first GPU (Graphics Processing Unit) 26, a second GPU 27, a RAM 24, and an LCD controller 31 are connected via a bus 22 to the CPU core 21. The memory card 17 is detachably connected to the connector 23. The memory card 17 comprises a ROM 17a which stores a game program and a RAM 17b which stores rewritable backup data. The game program stored in the ROM 17a of the memory card 17 is loaded into the RAM 24, and the game program loaded in the RAM 24 is executed by the CPU core 21. In addition to the game program, the RAM 24 stores temporary data obtained by the CPU core 21 executing the game program, and data for generating a game image. The touch panel 15, the right loudspeaker 30a, and the left loudspeaker 30b, and an operation switch section 14 composed of the cross switch 14a, the A-button 14d, and the like of FIG. 1, are connected to the I/F circuit 25. The right loudspeaker 30a and the left loudspeaker 30b are provided inside under the sound holes 18a and 18b, respectively.

A first VRAM (Video RAM) 28 is connected to the first GPU 26, and the second VRAM 29 is connected to the second GPU 27. The first GPU 26 generates a first game image based on data for generating a game image, the data being stored in the RAM 24, and draws the image into the first VRAM 28, in accordance with a command from the CPU core 21. Similarly, the second GPU 27 generates a second game image and draws the image into the second VRAM 29 in accordance with a command from the CPU core 21. The first VRAM 28 and the second VRAM 29 are connected to the LCD controller 31.

The LCD controller 31 includes a register 32. The register 32 stores a value of 0 or 1 in accordance with a command from the CPU core 21. When the value of the register 32 is 0, the LCD controller 31 outputs the first game image drawn in the first VRAM 28 to the first LCD 11, and outputs the second game image drawn in the second VRAM 29 to the second LCD 12. When the value of the register 32 is 1, the LCD controller 31 outputs the first game image drawn in the first VRAM 28 to the second LCD 12, and outputs the second game image drawn in the second VRAM 29 to the first LCD 11.

Note that the above-described structure of the game apparatus 10 is provided only for illustrative purposes, and the present invention can also be applied to any computer system which has at least one display device on a screen of which a touch panel is provided. Further, the game program of the present invention is not only supplied to a computer system via an external storage medium, such as the memory card 17 or the like, but also may be supplied to the computer system via a wired or wireless communication line. Alternatively, the game program of the present invention may be previously stored in a non-volatile storage device in the computer system.

Figure 3:
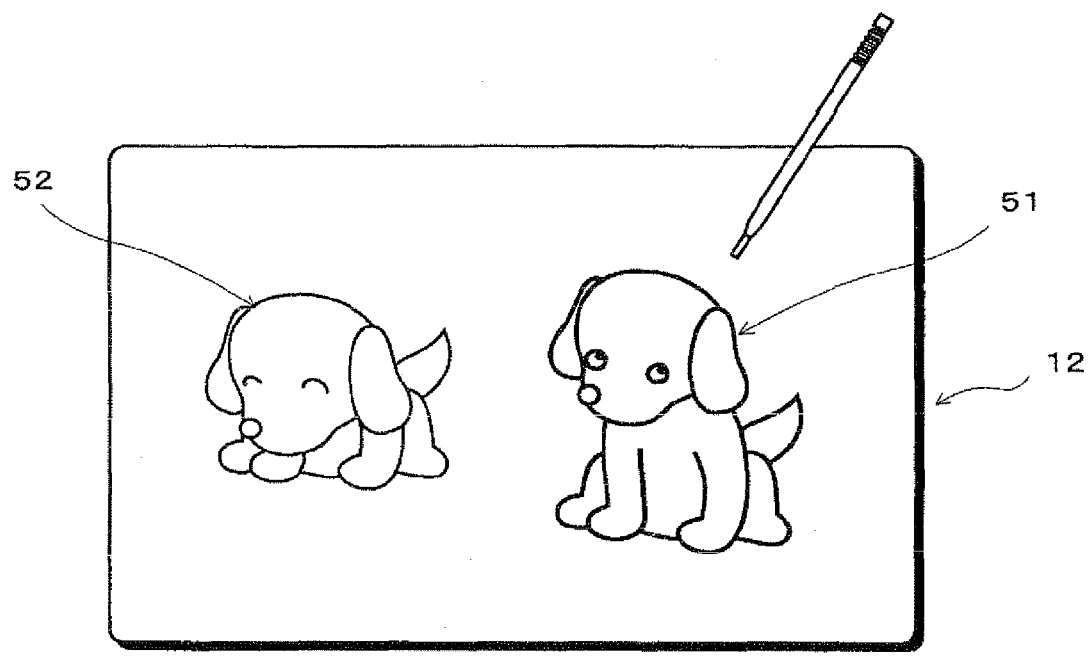
FIG. 3 is a diagram illustrating an exemplary game screen displayed based on a game program performed by the game apparatus 10 of FIG. 1.
Figure 4:
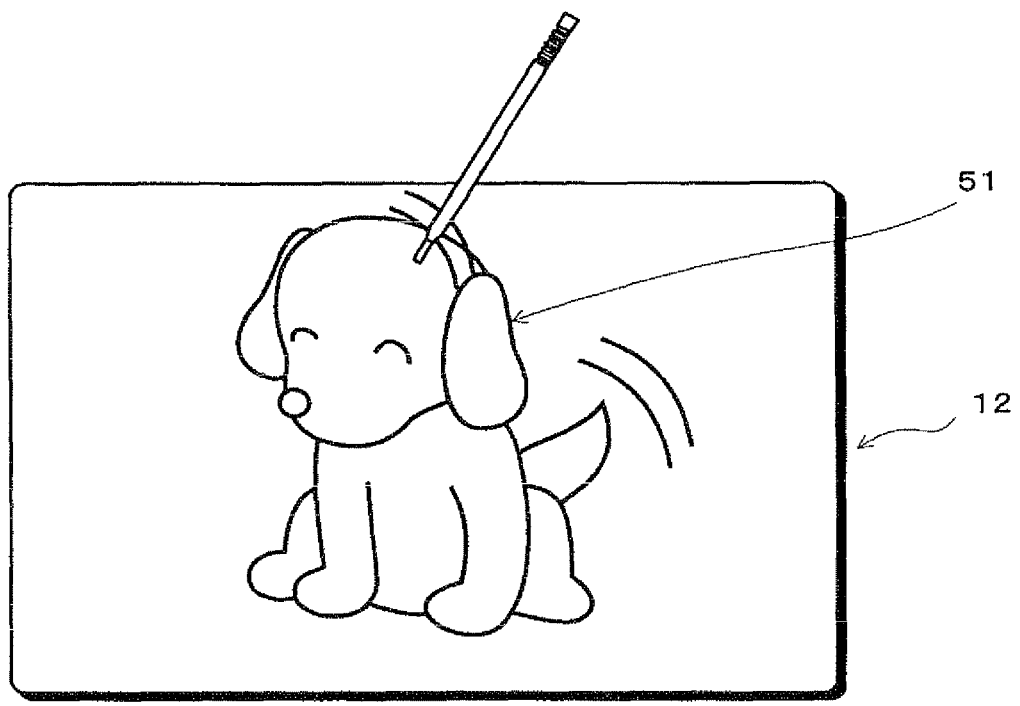
FIG. 4 is a diagram illustrating an exemplary game screen displayed based on a game program performed by the game apparatus 10 of FIG. 1.

Next, an outline of a game assumed in the embodiment of the present invention will be described with respect to FIGS. 3 and 4. FIG. 3 illustrates an exemplary game screen assumed in the embodiment of the present invention. In FIG. 3, the second LCD 12 displays objects (dogs as virtual pets) 51 and 52. This game is such that a player enjoys watching various reactions of an object in response to the player's touch on the object displayed on the screen using a stick or the like. In this game, when the object 51 or 52 is touched by the player using the stick 16 or the like, the object touched by the player is zoomed in as illustrated in FIG. 4. The player performs an operation, such as "stroke", "pat", or the like, with respect to the zoomed-in object using the stick 16 or the like, so as to enjoy a reaction of the object.

Figure 5:
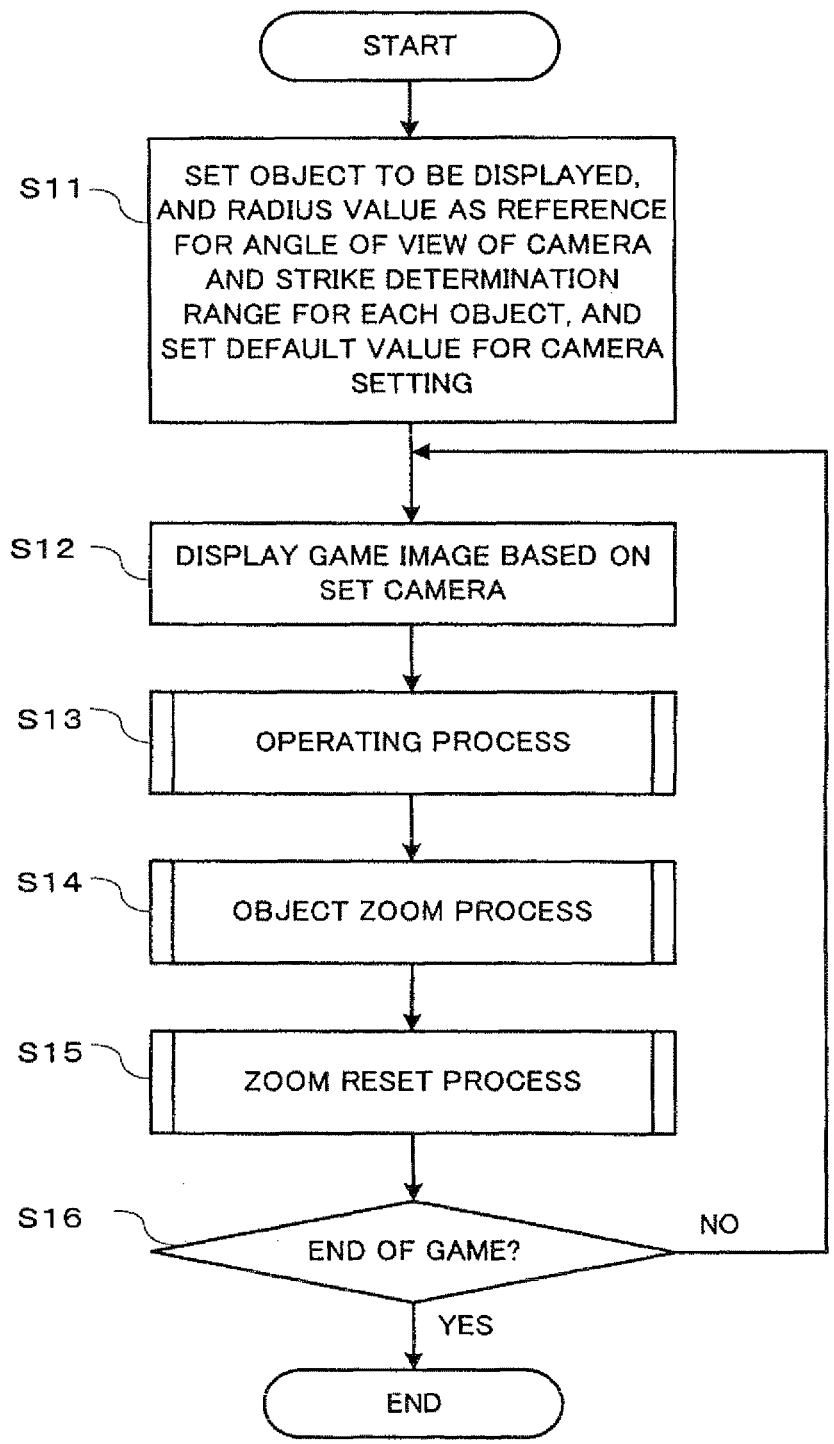
FIG. 5 is a flowchart illustrating a whole game image generating process performed by the game apparatus 10.
Figure 9:
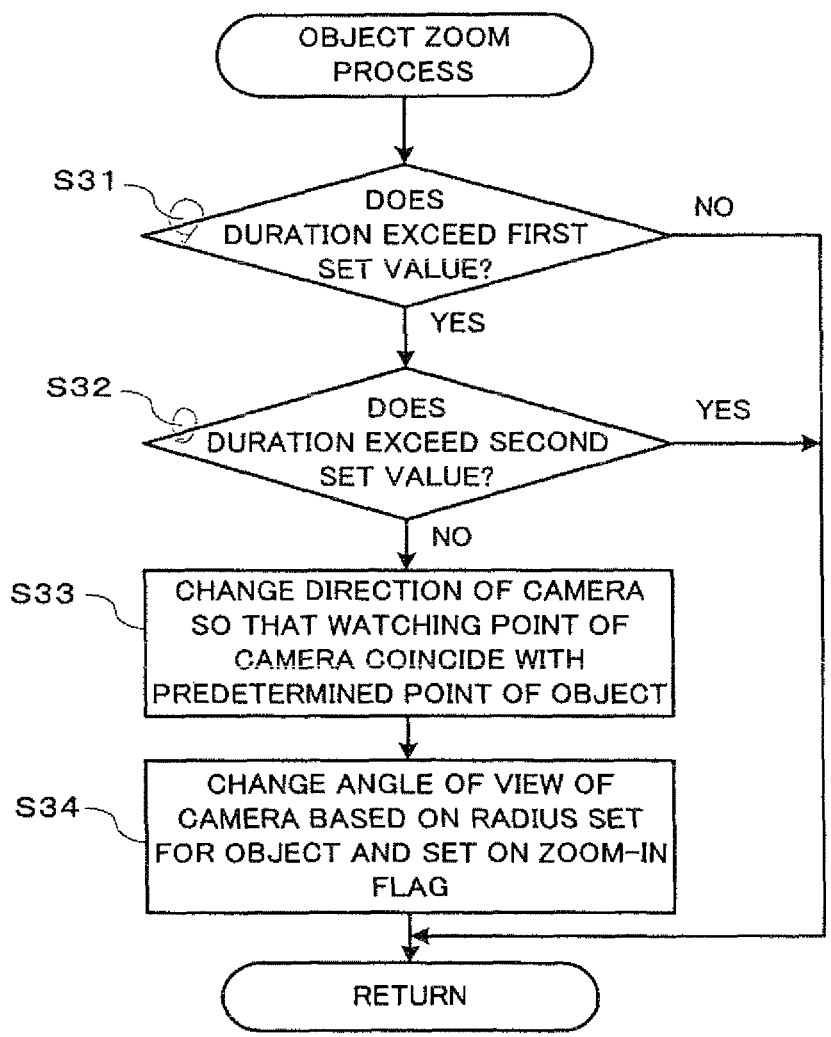
FIG. 9 is a flowchart illustrating a subroutine indicating a detailed operation of step S15 of FIG. 5.
Figure 10:
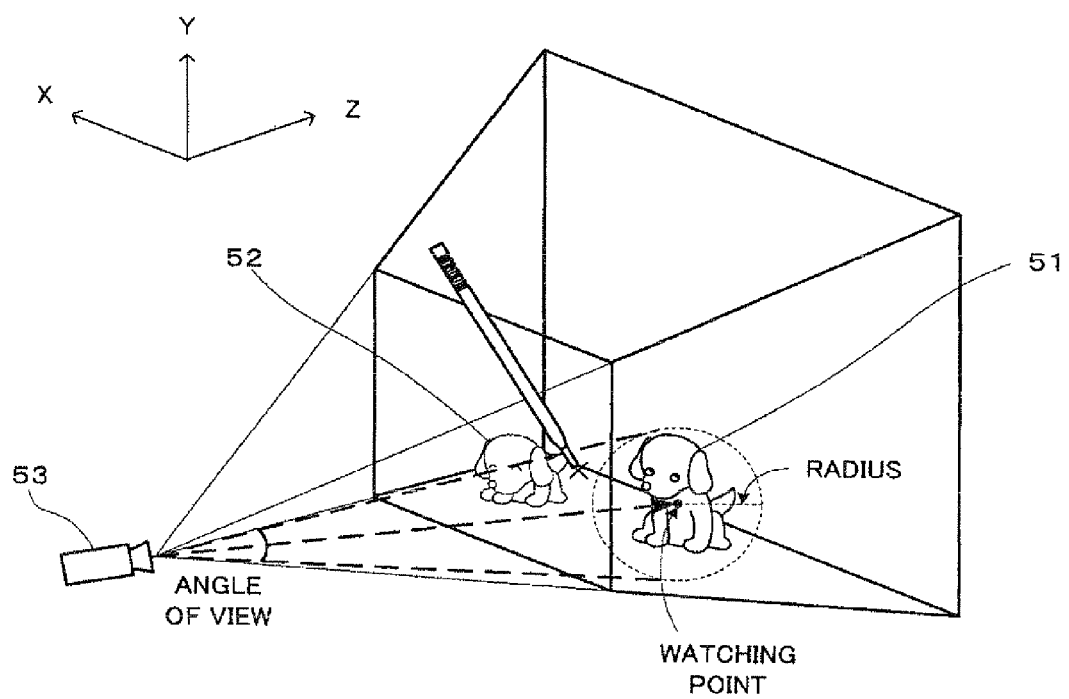
FIG. 10 is a diagram illustrating a change in an angle of view of a virtual camera in step S34 of FIG. 9.
Figure 11:
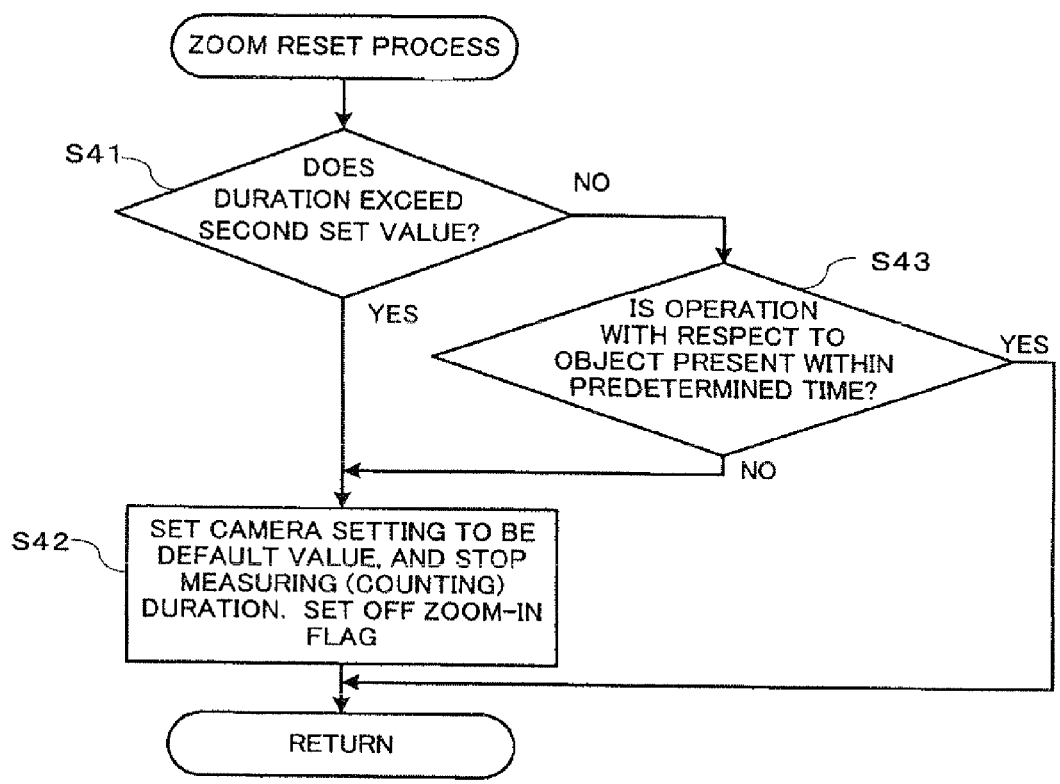
FIG. 11 is a diagram illustrating a subroutine indicating a detailed operation of step S16 of FIG. 5.

Next, a game image generating process performed by the game apparatus 10 will be described with reference to FIGS. 5 to 11. Note that FIG. 5 is a flowchart illustrating the whole game image generating process performed by the game apparatus 10. FIG. 7 illustrates a subroutine indicating a detailed operating process of FIG. 5. FIG. 9 is a subroutine illustrating a detailed operation of an object zoom process of FIG. 5. FIG. 11 illustrates a subroutine indicating a detailed operation of a zoom reset process of FIG. 5.

After the game apparatus 10 is powered ON, the CPU core 21 of the game apparatus 10 executes a boot program stored in a boot ROM (not shown), and initializes each unit, such as the RAM 24 and the like. Thereafter, a game program and various data stored in the memory card 17 are transferred via the connector 23 to the RAM 24, and execution of the game program is started.

In FIG. 5, the game is initialized (step S11). The initial setting process of step S11 will be specifically described. The CPU core 21 arranges images of an object, a background, and the like, which are to be displayed, in a three-dimensional space as appropriate. Next, a radius value is set with respect to each object to be displayed on a screen. The radius value is used so as to determine an angle of view of a virtual camera set in the three-dimensional game space in, for example, an object zoom process described below. Further, a strike determination range is set for each object. The strike determination range is set in the shape of a sphere in the three-dimensional space, and is used so as to, for example, determine an object to be zoomed in (the strike determination range is hereinafter referred to as a determination sphere). In addition, a first set value which is used as a threshold in, for example, the object zoom process described below, is set. The first set value is a threshold for determining whether or not a player has continued to touch the touch panel 15 for a predetermined time or more. For example, when the first set value is set to be "3 seconds", the object is not zoomed unless the user has continued to touch the object for 3 seconds or more (details thereof are described below). Next, parameters of the virtual camera are set to be initial values. The parameters include a position of the virtual camera, an angle of view, and a watching point. These initial values are set so that all objects to be displayed on the screen are accommodated in the screen.

After the above-described initial setting process is ended, the CPU core 21 displays an image viewed from the virtual camera on the second LCD 12 (step S12). Specifically, a modeling coordinate system which provides coordinate data of polygons constituting each object is transformed into a viewpoint coordinate system in which the virtual camera is placed at its origin. Thereafter, an effect of perspective or the like, a portion occluded by a front object, and the like are calculated, and projection transformation is performed. Finally, the resultant data is transformed into a screen coordinate system which fits a screen to be displayed, and thereafter, the transformed data is displayed on the second LCD 12.

Figure 6:
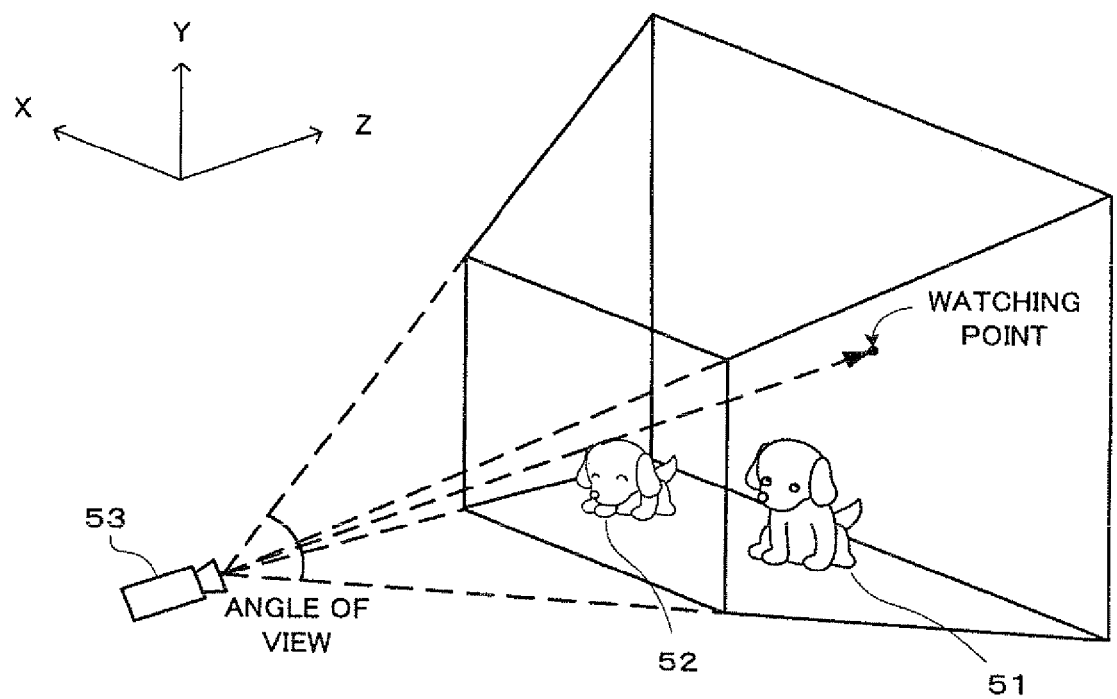
FIG. 6 is a diagram illustrating a relationship between a camera after initial setting and a three-dimensional space in step S12 of FIG. 5.
Figure 7:
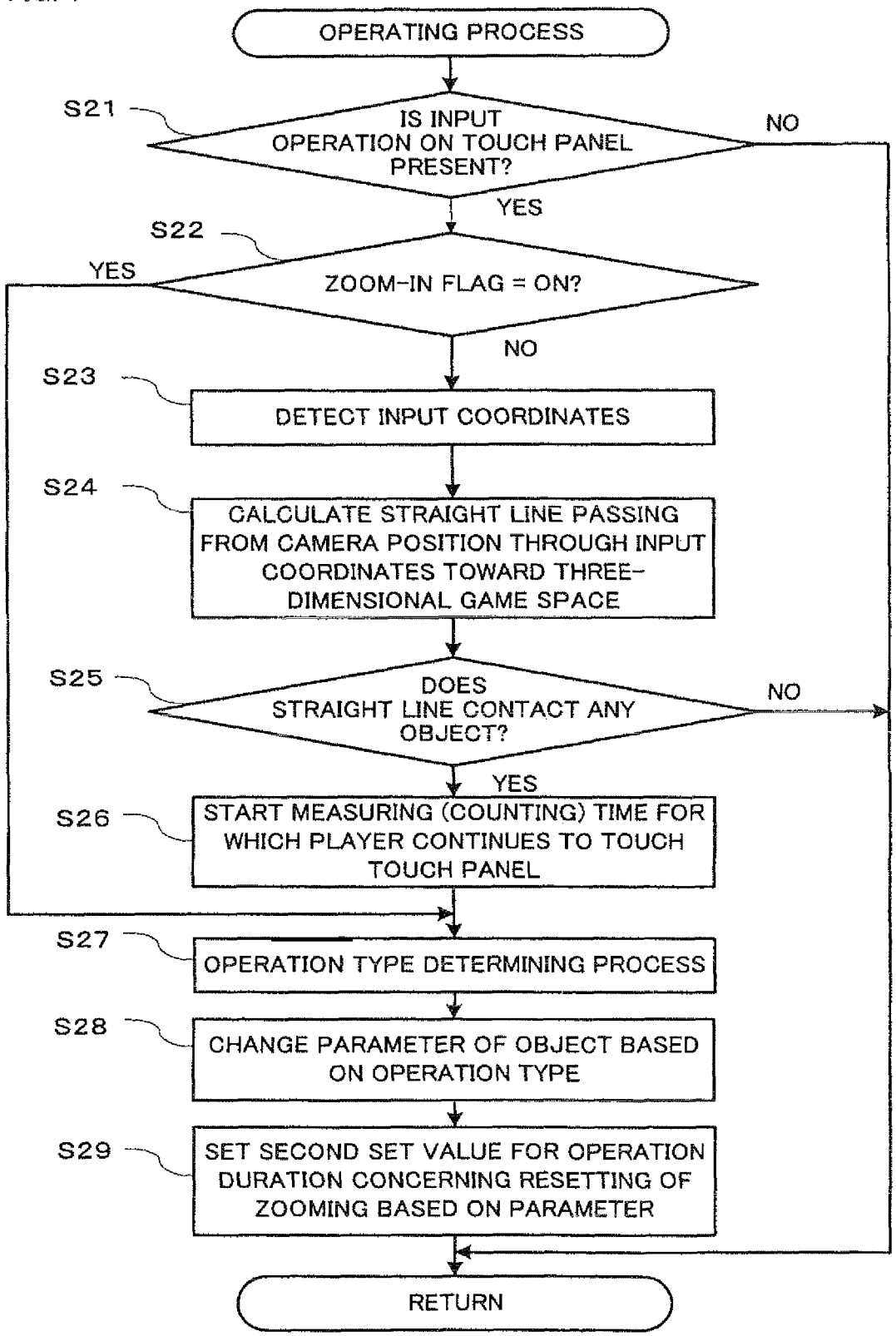
FIG. 7 is a flowchart illustrating a subroutine indicating a detailed operation of step S14 of FIG. 5.
Figure 8:
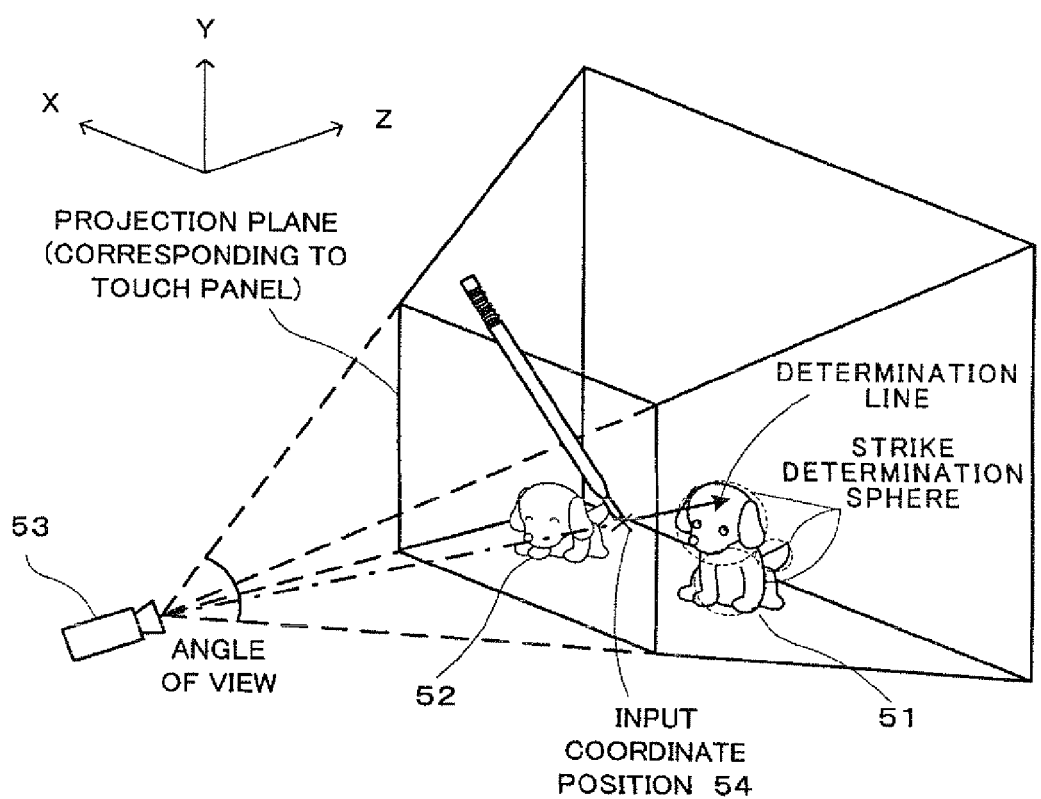
FIG. 8 is a diagram illustrating a relationship between a virtual camera, input coordinate values, and a determination line.

FIG. 6 is a diagram illustrating a relationship between the camera after the initial setting in step S11 and the three-dimensional space. When an image is drawn in the initially set three-dimensional space by the process of step S12, the objects 51 and 52 are displayed and accommodated within the screen as illustrated in FIG. 3. After the end of step S12, the CPU core 21 causes the process to go to the next step S13.

FIG. 7 is a flowchart illustrating details of the operation process of step S13. In FIG. 7, initially, the CPU core 21 determines whether or not an input operation (hereinafter referred to as a touch operation) has been performed on the touch panel 15 (step S21). When it is determined that a touch operation has not been performed (NO in step S21), the operating process is ended. On the other hand, when a touch operation has been performed (YES in step S21), the process goes to the next step S22. In step S22, it is determined whether or not a zoom-in flag which indicates whether or not an object is currently zoomed in is ON. When it is determined in step S22 that the zoom-in flag is ON (YES in step S22), the process goes to step S27 described below. On the other hand, when the zoom-in flag is OFF (NO in step S22), the process goes to the next step S23. In step S23, coordinate values (X, Y) input on the touch panel 15 are detected.

Next, the CPU core 21 calculates a straight line (hereinafter referred to as a determination line) which passes through the position of the virtual camera and coordinates in the three-dimensional space (hereinafter referred to as user pointed coordinates) corresponding to the coordinate values input on the touch panel 15 (step S24). Hereinafter, the process of step S24 will be specifically described. Note that, in the three-dimensional space, the Z axis of a world coordinate system is perpendicular to a projection plane, the X axis corresponds to a horizontal direction of the projection plane, and the Y axis corresponds to a vertical direction of the projection plane. The description will be continued, assuming that the three-dimensional space in the embodiment of the present invention has such a coordinate system.

Initially, coordinate values (x, y) are transformed into user pointed coordinates (X, Y, Z) on the touch panel 15 by: X=camX+(dXY.times.x); Y=camY+(dXY.times.y); and Z=camZ+dZ where camX, camY, and camZ indicate the coordinates of the virtual camera in the three-dimensional space, dXY indicates a variable for transforming the input coordinate values on the touch panel 15 into coordinate values in the three-dimensional space, and dZ indicates a distance from the virtual camera to the projection plane. Note that the variable dXY is calculated based on dZ and the tangent (tan) of an angle of view .theta. of the virtual camera by: dXY=dZ.times.tan .theta.

After the user pointed coordinates can be calculated, a determination line which passes through the position of the virtual camera and the user pointed coordinates is calculated.

Next, the CPU core 21 performs a process of identifying an object pointed by a player (step S25). Specifically, it is determined whether or not the determination line intersects the strike determination sphere of any one of objects in the three-dimensional space. When it is determined that the determination line intersects no strike determination sphere (NO in step S25), it is determined that no object is pointed and the operating process is ended. On the other hand, when the determination line intersects any one of the strike determination spheres (YES in step S25), it is determined that the player points an object which has the intersecting strike determination sphere. In this case, measurement (counting) of a time for which the player continues to touch the touch panel 15, i.e., a time for which the player continues to point the object (hereinafter referred to as a duration) is started (step S26). For example, in the case of FIG. 8, the determination line strikes the strike determination sphere (a head portion of a dog character) of the object 51. Therefore, it is determined that the player points the object 51, and measurement (counting) of a time for which the player continues to touch the touch panel 15 is started.

Next, an operation type is determined (step S27). The operation type is considered to include a "stroke" operation that, for example, the stick 16 is moved while touching the touch panel 15, and a "pat" operation that the stick 16 is alternately made in touch with and removed from the touch panel 15 quickly. The operation type is determined, for example, as follows. Initially, an input history of the stick 16 is recorded after zooming in. Next, changes in the touch state and the input coordinate values of the stick 16 are detected from the input history. When the input coordinate values vary within a predetermined range while the stick 16 continues to touch the touch panel 15, it is determined that the operation type is "stroke". The predetermined range is, for example, a range obtained by transforming the coordinates of the strike determination sphere of an object pointed by a player into two-dimensional coordinates on the touch panel 15. When a touched state and a non-touch state are alternately repeated and the input coordinate values fall within the predetermined range, it is determined that the operation type is "pat". With the above-described method, it is determined what action a player takes with respect to an object which is a virtual pet (dog).

Next, the CPU core 21 changes a parameter which is set for a specific object, based on the operation type determined in step S27 (step S28). In the embodiment of the present invention, a parameter called "tameness" is set to an object which is a virtual pet (dog). In step S28, the value of "tameness" is increased when the above-described operation type is "stroke", while the value of "tameness" is decreased when the operation type is "pat".

Next, a second set value is set based on the above-described parameter (step S29). The second set value is used so as to indicate timing of resetting zooming-in of a zoom process described below. For example, when the "tameness" is less than a predetermined value (less tame), the second set value is set to be 5 seconds. When the "tameness" is larger than or equal to the predetermined value (well tame), the second set value is set to be 10 seconds. After the second set value is set in step S29, the CPU core 21 ends the operating process, and causes the process to go to the object zoom process (step S14) of FIG. 5.

FIG. 9 is a flowchart showing details of the object zoom process of step S14 of FIG. 5. In FIG. 9, initially, the CPU core 21 determines whether or not the duration exceeds the first set value (i.e., whether or not a player has continued to touch the touch panel 15 for a predetermined time or more) (step S31). When it is determined that the duration does not exceed the first set value (NO in step S31), the object zoom process is ended.

On the other hand, when the duration exceeds the first set value (YES in step S31), the CPU core 21 determines whether or not the duration exceeds the second set value (step S32). When it is determined that the duration exceeds the second set value (YES in step S32), the object zoom process is ended. On the other hand, when the duration exceeds the second set value (YES in step S32), the process goes to the next step S33.

In step S33, the CPU core 21 sets a predetermined point (e.g., a center point) on an object (hereinafter referred to as a target object) contacting a determination line to be a watching point. Thereafter, the CPU core 21 causes the process to go to the next step S34.

In step S34, the CPU core 21 changes the angle of view of the virtual camera based on a radius value set for the target object. In addition, the zoom-in flag is set ON. A specific example will be described with reference to FIG. 10. Initially, a center of the target object 51 is set to be a watching point. Thereafter, an angle of view which allows a diameter of a sphere having the radius set for the object 51 with a center point thereof being the watching point, to be equal to a vertical size of the screen (i.e., an angle of view with which the object 51 is zoomed in and displayed) is set in the virtual camera. When the process (screen drawing process) of step S12 is performed after step S34, a screen on which the object is zoomed in is displayed as illustrated in FIG. 4.

After the end of step S34, the CPU core 21 ends the object zoom process, and causes the process to go to the zoom reset process (step S15) of FIG. 5. In the zoom reset process of step S15, even when a player performs any operation during zooming in, zoom-in display (see FIG. 4) is brought back to original display (see FIG. 3) if a time set in the second set value has passed. Also when a player does not perform any operation for a predetermined time or more after zooming in, zoom-in display is similarly brought back to original display.

FIG. 11 is a flowchart illustrating details of the zoom reset process of step S15. In FIG. 11, initially, the CPU core 21 determines whether or not the duration exceeds the above-described second set value (step S41). When it is determined that the duration exceeds the second set value (YES in step S41), the virtual camera is initialized. In addition, the measurement (counting) of the duration started in step S26 is stopped (step S42). This corresponds to, for example, a situation that, when the second set value is set to be 10 seconds, an object continues to be stroked for 10 seconds or more while the object is zoomed in. On the other hand, when the duration does not exceed the second set value (NO in step S41), the process goes to step S43.

In step S43, it is determined whether or not a touch operation has been performed with respect to an object within a predetermined time. Specifically, after an object is zoomed in, it is determined whether or not any touch operation has been performed with respect to the object within the second set value (e.g., 10 seconds). When it is determined that a touch operation has been performed within the predetermined time (YES in step S43), a player is currently performing any touch operation with respect to the object, and therefore, the setting of the camera is maintained (zoom-in display is maintained) and the zoom reset process is ended. On the other hand, when a touch operation has not been performed within the predetermined time (NO in step S43), the CPU core 21 causes the process to go to step S42. Specifically, after the object (dog) is zoomed in, when the object is left without a touch operation, the setting of the camera is reset to be initial values and the zoom-in process is reset after a predetermined time (e.g., 5 seconds) is elapsed. Thus, the zoom reset process is ended.

Referring back to FIG. 5, after the end of the zoom reset process in step S15, it is determined whether or not a predetermined game termination condition is satisfied (step S16). When the predetermined game termination condition is not satisfied (NO in step S16), the process returns to step S12, and the operations of steps S12 to S16 are repeatedly performed until the predetermined game termination condition is satisfied. On the other hand, when the predetermined game termination condition is satisfied (YES in step S16), a predetermined game over process (e.g., a process of selecting whether or not to continue the game, etc.) is performed and the game is ended. Thus, the game image generating process of the embodiment of the present invention is ended.

As described above, according to the game program of an embodiment of the present invention, by a player touching an object displayed on a screen via a touch panel, the touched object can be zoomed in and displayed. Therefore, an object can be more easily operated.

In addition, it is determined whether or not an object is touched, depending on whether or not the determination line in the three-dimensional space intersects the strike determination sphere. Here, it may be determined whether or not a player points an object, on a two-dimensional coordinate system. In this method, initially, each object in the three-dimensional space is transformed into two-dimensional coordinates. Thereafter, it is determined whether or not coordinates input by the player fall within a strike determination range set for each object. Therefore, if the number of objects is large, the processing amount of transformation into two-dimensional coordinates is large. In addition, the transformation from three-dimensional coordinates into two-dimensional coordinates requires a large amount of computation, i.e., the load of the transformation process itself is high. By contrast, according to the embodiment of the present invention, coordinates input by a player on a touch panel only need to be transformed into coordinates in a three-dimensional space, and thereafter, it is only determined whether or not a straight line intersects a sphere. Therefore, the process load can be reduced as compared to the above-described process of determination on the two-dimensional coordinate system. In addition, since a zoom-in control is performed based on a radius value set for each object, an object can be zoomed in by a process which is simpler than when the size of an object is calculated and the angle of view of a camera is calculated every time the object is zoomed in.

In addition, a time for which a player touches the touch panel is measured so as to regulate the timing of zooming in an object. Thereby, it is possible to prevent an unnecessary zoom process due to an erroneous operation by a player, e.g., it is possible to prevent an object from being zoomed in by accidental and brief touch. Specifically, when an operation is performed using a touch panel, since the entire display screen generally receives the operation, an erroneous operation of a player, an erroneous detection of touch panel coordinates, or the like is more likely to occur than in ordinary button operations. Therefore, when the above-described camera moving technique of Japanese Patent Laid-Open Publication No. 2001-178963 is employed in, for example, a game in which an operation is performed using a touch panel, an object which is not intended by a player may be selected due to an erroneous operation, an erroneous detection, or the like, and be zoomed in. As a result, viewpoints are frequently switched, resulting in considerably poor game performance. Therefore, in an embodiment of the present invention, a time for which a player touches the touch panel is measured so as to regulate the timing of zooming in an object.

In addition, if the duration of an operation becomes longer than or equal to a predetermined time after an object is zoomed in and displayed, a camera control can be brought back to an original state. Since the predetermined time is set based on a parameter for each object, a time until a camera control is brought back to an original state can be set for each object. Since the value of the parameter is changed depending on a pointed state of an object, the time until a camera control is brought back to an original state can be changed depending on the contents of a control by the player.

Although the parameters of the virtual camera in the above-described embodiment of the present invention include the position, the angle of view, and the watching point of the virtual camera, the present invention is not limited to these. Any parameter whose value can be changed to perform zoom-in display may be used.

Although a touch panel is employed in the above-described embodiment of the present invention, an object may be pointed by a player using a mouse instead of a touch panel.

While the invention has been described in detail, the foregoing description is in all aspects illustrative and not restrictive. It is understood that numerous other modifications and variations can be devised without departing from the scope of the invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A non-transitory storage medium storing a program executable on a computer of an input processing apparatus having a display device which displays an image captured by a virtual camera viewing a three-dimensional virtual space, and an input device which points to a position on the displayed image, the program causing the computer to execute:
    a first camera setting operation to set a first value of a parameter of the virtual camera;
    a first display operation to display a first image of the three-dimensional virtual space captured by the virtual camera, while the parameter is set to the first value;
    a position detecting operation to detect a position on the displayed first image pointed to by a user using the input device;
    a straight line calculating operation that calculates a straight line passing through a position in the three-dimensional space corresponding to the detected position and a position corresponding to the virtual camera in the three-dimensional space;
    an object identifying operation that identifies, as a target to be zoomed in on, a virtual object intersecting the straight line and appearing in the first image;
    a second camera setting operation that automatically changes the parameter from the first value to a second value to zoom in on the identified object; and
    while the parameter is set to the second value, capture a second image of the identified object with the virtual camera and display the captured second image.

2. The non-transitory storage medium according to claim 1, wherein the program causes the computer to further execute:
    an area setting operation which sets a region in the three-dimensional virtual space aligned with each of a plurality of the virtual objects shown in the first image, wherein in the object identifying operation determines whether the virtual object intersects the straight line based on whether the straight line extends through the region for the object.

3. The non-transitory storage medium according to claim 2 wherein the region for each object is a sphere.

4. The non-transitory storage medium according to claim 2, wherein, the second camera setting operation sets the second value to align a watching point of the virtual camera with a predetermined point on the identified object, and sets an angle of view of the virtual camera based on the predetermined point of the identified object.

5. The non-transitory storage medium of claim 1 wherein the parameter is at least one of a camera position, camera angle, an angle of view and a watching point for the virtual camera.

6. An input processing apparatus comprising:
    a display device that displays an image captured by a virtual camera viewing a three-dimensional space;
    an input device to be applied to a position on the displayed image; and
    a processor executing a program stored on a non-transitory storage media, the program including executable instructions causing the input processing apparatus to:
    set a first value of a parameter of the virtual camera;
    display an image capture by the virtual camera while parameter is set to the first value of the parameter;
    detect the position on the displayed image to which the input device is applied on the displayed image when the image;
    calculate a straight line passing through a position in the three-dimensional space corresponding to the detected position and a position of the virtual camera;
    identify a virtual object, as a target to be zoomed in on, that intersects the straight line;
    automatically change the first value to a second value of the parameter to cause the virtual camera to zoom in on the identified object; and
    a second display operation to cause the display device to display the image captured by the virtual camera while the parameter is set to the second value.

7. The input processing apparatus of claim 6 wherein the parameter is at least one of a camera position, camera angle, an angle of view and a watching point for the virtual camera.

8. An input processing apparatus comprising:
    a display device that displays an image captured by a virtual camera viewing a three-dimensional space;
    an input device applied to a position on the displayed image presented by the display device;
    a first camera setting logic module that sets a first angle of view of the virtual camera;
    a first display step logic module that causes the display device to display a first image of the three dimensional space taken from the perspective of the first angle of view set by the first camera setting logic module;
    a position detecting logic module to detect the position of the input device on the first image when displayed by the first display logic module;
    a straight line calculating logic module that calculates a straight line passing through a position in the three-dimensional space corresponding to the position detected by the position detecting logic module and a position of the virtual camera in the three-dimensional space;
    an object identifying logic module that identifies a virtual object, as a target to be zoomed in on, intersecting the straight line and shown in the first image displayed by the first display logic unit;
    a second camera setting logic unit that automatically sets a second angle of view of the virtual camera to zoom in and capture a second image of the identified object, wherein the second angle of view is different than the first angle of view; and
    a second display logic unit that causes the display device to display the second image in accordance with the second angle of view.

9. A non-transitory storage medium storing a program executable on a computer generating images of a three-dimensional space, wherein the images are generated from a point of view a virtual camera, the computer receives inputs from an input device which points to a position on a displayed image of the three-dimensional space, the computer executes the program to:
set a first angle of view of the virtual camera;
display a first image captured by the virtual camera set at the first angle of view in the three-dimensional space;
detect a position on the displayed first image pointed to by the input device;
calculate a straight line in the three dimensional space passing through a point in the three-dimensional space corresponding to the detected position and the virtual camera at the first angle of view;
identify an object in the three-dimensional space intersecting the straight line and shown in the displayed first image;
automatically set a second angle of view of the virtual camera to direct the virtual camera to the identified object, wherein the second angle of view is different than the first angle of view, and
capture with the virtual camera set at the second angle of view a second image including the identified object and display the second image.

10. A method for displaying an image on a display device, wherein a computer generates an image to be displayed on the display device from a three-dimensional (3D) space, and the computer receives inputs from an input device pointing to a position on a screen of the display device, the method comprising:
setting a first angle of view of a virtual camera in the 3D space;
displaying on the screen of the display device a first image of the 3D space taken by the virtual camera from the perspective of the first angle of view;
detecting a position on the displayed first image pointed to by the input device applied to the screen;
calculating a straight line in the 3D space passing through a position in the three-dimensional space corresponding to the detected position and a position of the virtual camera at the first angle of view;
identifying a virtual object in the 3D space intersecting the straight line and shown in the first image;
automatically setting a second angle of view of the virtual camera to zoom-in-on the identified virtual object, wherein the second angle of view is different than the first angle of view,
taking a second image of the identified virtual object by the virtual camera at the second angle of view; and
displaying the second image on the screen of the display device.

11. A system comprising:
a display device displaying an image generated of a three-dimensional space from a perspective of a virtual camera in the space;
an input device applied to a position on the displayed image selected by a user, and
a computer generating the three-dimensional space and the virtual object, the computer executing a program stored on a non-transitory storage medium accessible to the computer, wherein execution of the program causes the system to perform:
a first camera setting operation to set a first angle of view of the virtual camera;
a first display operation to cause the display device to display an image taken from the first angle of view by the virtual camera;
a position detecting operation to detect the position of the input device on the image displayed by the first display operation;
a straight line calculating operation that calculates a straight line passing through a position in the three-dimensional space corresponding to the position detected by the position detecting operation and a position in the three-dimensional space of the virtual camera at the first angle of view;
an object identifying operation that identifies an object in the three-dimensional space intersecting the straight line and shown in the image displayed by the first display operation;
a second camera setting operation that automatically sets a second angle of view of the virtual camera to zoom in on the identified object, wherein the second angle of view is different than the first angle of view; and
a second display operation to display an image of the object taken by the virtual camera from the second angle of view.

12. The system as in claim 11 wherein the computer and the display device are housed together in a housing.

13. A method for displaying an image on a display device, wherein the image is generated by a computer based on a three-dimensional (3D) space from a perspective of a virtual camera, and an input device that points to a position on a screen of the display device, the method comprising:
a first camera setting operation to set a value of a parameter of the virtual camera
a first display operation to display on the screen the image captured by the virtual camera while with the parameter is at the value set by the first camera setting step;
a position detecting operation to detect a position on the screen pointed to by the input device when the image is displayed by the first display operation;
a straight line calculating operation that calculates a straight line passing through a position in the three-dimensional space corresponding to the position on the screen detected by the position detecting operation and a position in the three-dimensional space of the virtual camera while the parameter is at the value set by the first camera setting operation;
an object identifying operation that identifies, as a target to be zoomed in on, an object intersecting the straight line and shown in the image displayed by the first display operation;
a second camera setting operation that automatically changes the value of the parameter of the virtual camera to zoom in on the identified object; and
a second display operation to cause the display device to display an image captured by the virtual camera when the parameter is set to the changed value.

14. A system comprising:
a display device having a display displaying an image generated of a three-dimensional space taken by a virtual camera in the space;
an input device adapted to be applied to a position on the displayed image to provide an input to the system, and
a computer generating the three-dimensional space, the computer executing a program stored on a non-transitory storage medium accessible to the computer, wherein execution of the program causes the system to:

set a first value of a parameter of the virtual camera in the three-dimensional space;

cause the display device to display a first image of the three-dimensional space captured by the virtual camera while the parameter is set to the first value;

detect a position on the displayed first image indicated by an operation performed using the input device;

calculate a straight line passing through a position in the three-dimensional space corresponding to the detected position and the virtual camera;

identify a virtual object as a target to be zoomed in on, wherein the object intersects the straight line and is shown in the displayed first image;

automatically change the first value of the parameter to a second value to cause the virtual camera to zoom in on the identified virtual object, and cause the display device to display a second image captured by the virtual camera while the parameter is set to the second value.

15. The system as in claim 14 wherein the computer and the display device are housed together in a common housing.

16. A non-transitory storage medium storing a program executable on a computer generating images of a three-dimensional space and an object in the space for a display device, wherein the images are generated from a point of view a virtual camera, the computer receives inputs from an input device which points to a position on a displayed image, the program when executed by the computer causes the computer to:

set a first angle of view of the virtual camera;

display on the screen the image using the display device in accordance with the first angle of view;

detect a position on the displayed image pointed to by the input device;

calculate a straight line passing through a position in the three-dimensional space corresponding to the detected position and a position of the virtual camera in the three-dimensional space;

identify a virtual object in the three-dimensional space intersecting the straight line;

automatically set a second angle of view of the virtual camera to zoom in on the identified object, wherein the second angle of view is different than the first angle of view, and display on the screen the identified object, wherein the display of the identified object is from the perspective of the second angle of view.

* * * * *